United States Patent
Dean

(10) Patent No.: US 12,391,302 B2
(45) Date of Patent: Aug. 19, 2025

(54) HANDWHEEL FORCE FEEDBACK ACTUATOR

(71) Applicant: Schaeffler Technologies AG & Co. KG, Herzogenaurach (DE)

(72) Inventor: Trenton Dean, Casco, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/653,047

(22) Filed: May 2, 2024

(65) Prior Publication Data

US 2024/0367709 A1    Nov. 7, 2024

Related U.S. Application Data

(60) Provisional application No. 63/464,050, filed on May 4, 2023.

(51) Int. Cl.
*B62D 5/00* (2006.01)
*B62D 5/04* (2006.01)

(52) U.S. Cl.
CPC ........... *B62D 5/005* (2013.01); *B62D 5/0454* (2013.01)

(58) Field of Classification Search
CPC .............................. B62D 5/0454; B62D 5/005
See application file for complete search history.

(56) References Cited

U.S. PATENT DOCUMENTS

| | | | | |
|---|---|---|---|---|
| 5,803,202 A | * | 9/1998 | Bohner | B62D 5/005 180/443 |
| 11,046,354 B2 | * | 6/2021 | Klinger | B62D 5/005 |
| 2010/0280716 A1 | * | 11/2010 | Shah | B62D 5/008 701/41 |
| 2017/0158222 A1 | * | 6/2017 | Schulz | B62D 5/006 |
| 2024/0300568 A1 | * | 9/2024 | Hrusch | B62D 5/005 |
| 2024/0377182 A1 | * | 11/2024 | Dean | H02K 29/08 |
| 2025/0042465 A1 | * | 2/2025 | Markström | B62D 5/005 |

FOREIGN PATENT DOCUMENTS

| | | | | |
|---|---|---|---|---|
| DE | 19539101 C1 | * | 2/1997 | ............ B62D 5/005 |
| DE | 102015015147 A1 | * | 6/2017 | ............ B62D 5/005 |
| DE | 102015015148 A1 | * | 6/2017 | ............ B62D 5/005 |
| DE | 102019211644 A1 | * | 2/2021 | ............ B62D 1/181 |
| FR | 2922848 A1 | * | 5/2009 | ............ B62D 5/005 |
| SE | 2250146 A1 | * | 9/2023 | |

\* cited by examiner

*Primary Examiner* — Randell J Krug
(74) *Attorney, Agent, or Firm* — Volpe Koenig

(57) ABSTRACT

A handwheel actuator for a steering system includes a housing, a steering shaft supported by the housing and configured to be coupled to a handwheel for receiving driver input from a driver and transmitting feedback to the driver, a first spring for biasing the steering shaft in a first rotational direction, the first spring coupled to the steering shaft by a first static spring seat, a second spring for biasing the steering shaft in a second rotational direction opposite the first rotation direction, the second spring coupled to the steering shaft by a second static spring seat, a controlled spring seat coupled to the first spring and the second spring and rotatable to change a pre-load of at least one of the first or second springs. Rotation of the controlled spring seat changes a torsional load applied to the steering shaft via at least one of the first spring or the second spring.

18 Claims, 17 Drawing Sheets

HANDWHEEL FORCE FEEDBACK ACTUATOR

CROSS-REFERENCE TO RELATED APPLICATIONS

This application claims the benefit of U.S. Provisional Application Ser. No. 63/464,050 filed on May 4, 2023, which is incorporated by reference herein in its entirety.

TECHNICAL FIELD

The present application relates generally to a handwheel actuator for a drive-by-wire steering system of a motor vehicle.

BACKGROUND

Electric steering devices are used, among other things in motor vehicles, to receive a driver's direction request and to convert it into corresponding movements of one or more wheels. Compared to purely mechanical steering devices, a distinction is made between electrical steering devices between electrically assisted steering devices and fully electric steering devices, so-called "steer-by-wire" steering devices. These steer-by-wire steering devices in particular have the advantage that the control unit can be positioned relatively freely within the vehicle independently of mechanical connection components, which, in addition to cost savings when distinguishing between, for example, right-hand and left-hand drive vehicles, also improves accident behavior due to the absence a steering column. Furthermore, the control unit can be brought into a stowage position, which is also used, for example, with fully automatic steering.

A steer-by-wire steering system in the context of the present invention is to be understood as meaning a steering system which essentially consists of a so-called hand wheel actuator (HWA), for example the actuator system around the commanding vehicle steering wheel, and a road wheel actuator (RWA), i.e. the actuator system that acts on the steering mechanism connected to the vehicle wheels. The steering signal is transmitted from the HWA to the RWA via wire.

Mechanical steering systems inherently provide force feedback to the driver as the wheels of the vehicle are subjected to various forces during operation. This force feedback is important for enabling a driver to operate the vehicle. In steer-by-wire steering systems, a motor is used to provide force feedback to the driver.

SUMMARY

Aspects of the present disclosure are directed to a fully functional low-cost handwheel force feedback actuator. In one embodiment, a spring driven handwheel actuator (HWA) system with actively controlled variable spring rate (Nm/deg) is disclosed. The actively controlled variable spring rate allows the HWA to create variable force feedback for the driver. Integrating the active control motor and the spring arrangement in series allows the motor to be downsized significantly, reducing overall system cost. Spring rate (also referred to as stiffness) is the ratio of spring force to displacement. A traditional spring arrangement fixes one end of the spring statically and displaces the other (dynamic) end of the spring. Assuming a constant spring rate, this arrangement will always produce a given load at a given displacement. In a traditional handwheel actuator application, this linear spring behavior would limit the feedback that can be provided to the driver. Accordingly, the handwheel feedback of traditional handwheel actuators may be inadequate or different from a purely mechanical steering system.

In accordance with one aspect, a handwheel actuator for a steering system comprises a housing, a steering shaft supported by the housing and configured to be coupled to a handwheel for receiving driver input from a driver and transmitting feedback to the driver, a first spring for biasing the steering shaft in a first rotational direction, the first spring coupled to the steering shaft by a first static spring seat, a second spring for biasing the steering shaft in a second rotational direction opposite the first rotation direction, the second spring coupled to the steering shaft by a second static spring seat, a controlled spring seat coupled to the first spring and the second spring and rotatable to change a pre-load of at least one of the first or second springs. Rotation of the controlled spring seat changes a torsional load applied to the steering shaft via at least one of the first spring or the second spring.

The torsional load can be defined by a non-linear characteristic curve within a torsional load versus handwheel rotational angle plot. An articulation range of the first and second springs can be plus or minus 45 degrees, for example. The controlled spring seat can be arranged coaxially with the first static spring seat and the second static spring seat about the steering shaft. An electric motor can be configured to rotate the controlled spring seat. The electric motor can be coupled to a worm that drives a worm gear to rotate the controlled spring seat. The worm can be connected to the electric motor by a splined connection and supported by the housing for limited axial movement. At least one clutch for resisting rotation of the worm when the worm is displaced axially can be provided. The at least one clutch can include a cone clutch and activation of the cone clutch can be determined by a wave spring that resists axial displacement of the worm. The worm gear can be integral with the controlled spring seat. The controlled spring seat can include axial slots for receiving spring tails of the first and second springs. The first and second springs can include torsion springs supported coaxially with the steering shaft. The first and second springs can be wound in opposite directions.

The handwheel actuator can include a damper for resisting rotation of the steering shaft. The damper can be selectively activatable between an engaged state resisting rotation of the steering shaft and a disengaged state. The handwheel actuator can include an actuator for engaging and disengaging the damper. The actuator can include a normally-engaged solenoid.

The handwheel actuator can include a mechanical end stop for limiting rotation of the steering shaft. The mechanical end stop can restrict rotation of the steering shaft beyond plus or minus 5 degrees beyond a maximum total handwheel articulation.

BRIEF DESCRIPTION OF THE DRAWING(S)

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENT(S)

Figure 1:
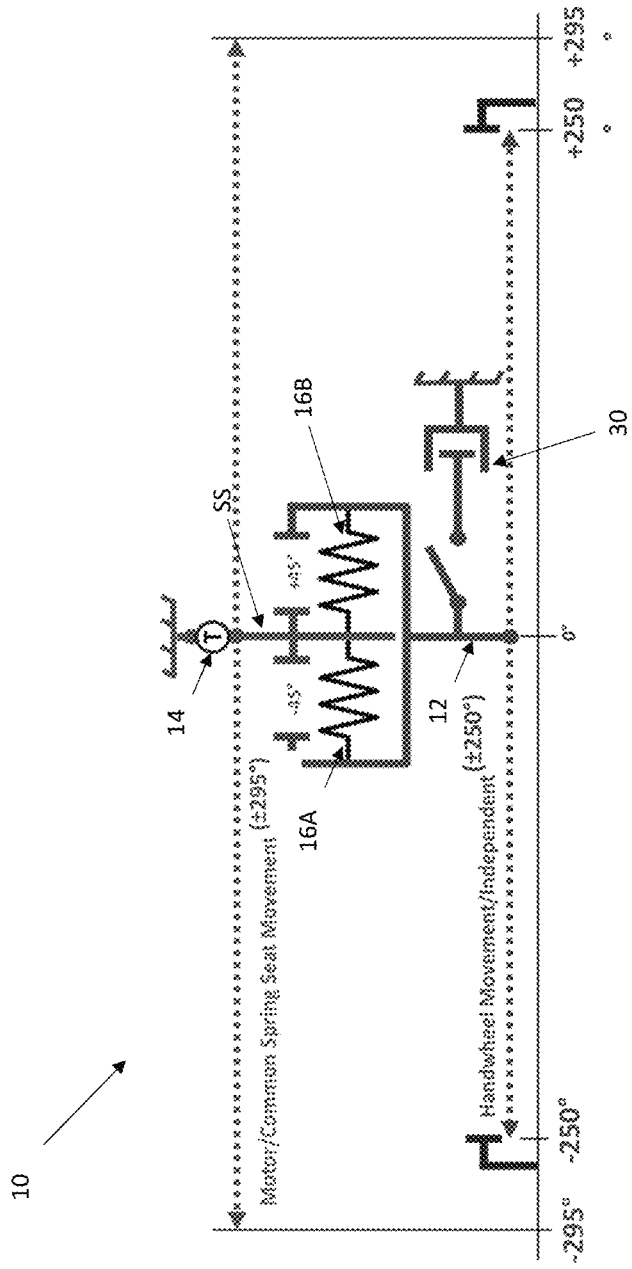
FIG. 1 shows a schematic diagram depicting a working principle of an exemplary embodiment of a handwheel actuator in accordance with the present disclosure.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

FIG. 1 shows a schematic diagram that depicts a working principle for an exemplary HWA 10 in accordance with the present disclosure. The operational characteristics of the HWA 10 will be described in connection with FIGS. 1 and 2, while an exemplary physical embodiment of an HWA 110 in accordance with the present disclosure will be described in connection with FIGS. 3-17.

As shown in FIG. 1, a handwheel of the HWA 10 includes first and second springs 16A and 16B and is allowed to rotate a full required articulation range as shown by the lower dashed line. In an example embodiment, the articulation range of the handwheel is ±250 degrees, but it is not limited to this. A position of a spring seat SS is only limited by ±45 degree end stops fixed to a steering shaft 12. The position of the spring seat SS position is actively controlled by a motor 14. Displacing the spring seat SS relative to the handwheel imparts a displacement into first and second springs 16A, 16B, resulting in a torque felt at the handwheel, independent of the handwheel position. Each of the first and second springs 16A, 16B has a total useable range of zero to 90 degrees and is preloaded to the 45 degree position in the nominal centered position. The first and second springs 16A, 16B are wound in opposite directions, creating a balanced (neutral) handwheel torque at zero degrees. A small switchable passive friction element within the handwheel actuator 10 (that acts on a shaft of the handwheel) serves as a damper 30 and is used to control oscillations larger than what the motor/controller 14 can dampen.

Figure 2:
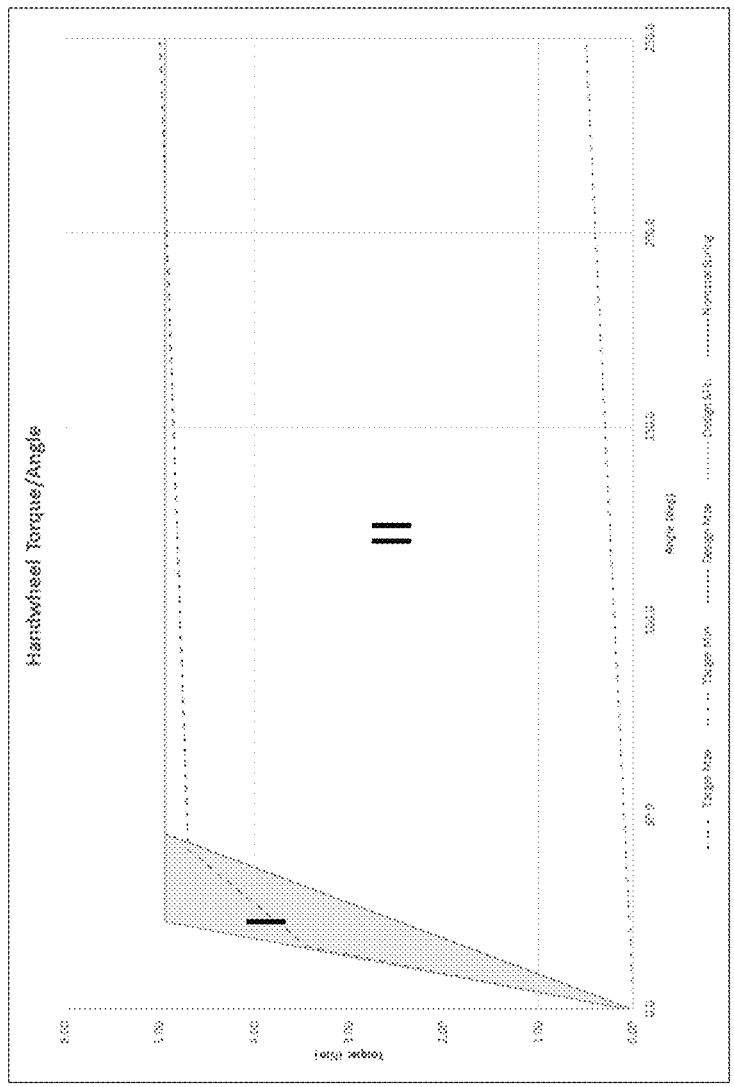
FIG. 2 shows an example embodiment of a torque versus angle plot according to an exemplary embodiment of a handwheel actuator in accordance with the present disclosure.
Figure 3:
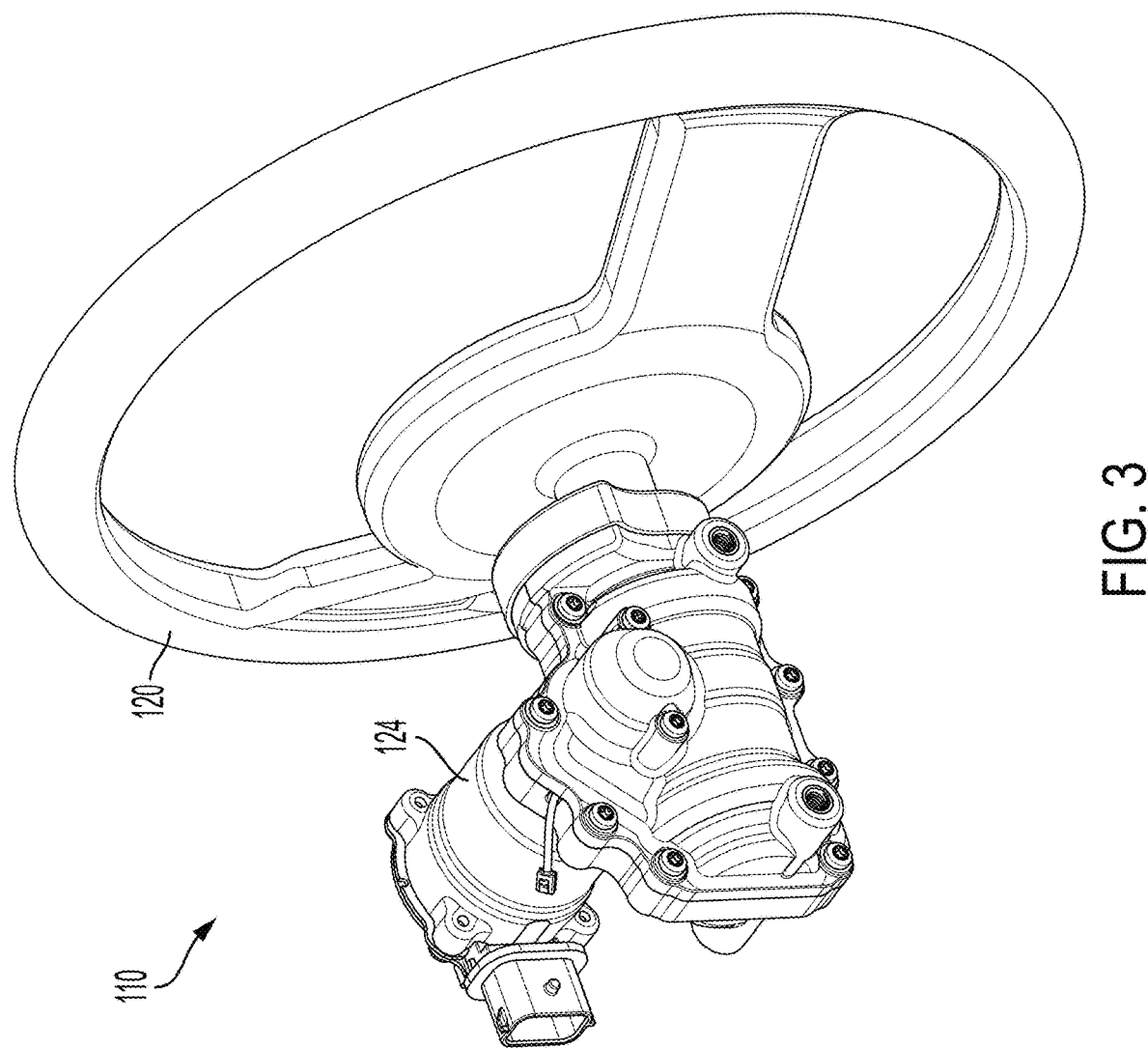
FIG. 3 shows a perspective view of an exemplary embodiment of a handwheel actuator and a handwheel in accordance with the present disclosure.
Figure 4:
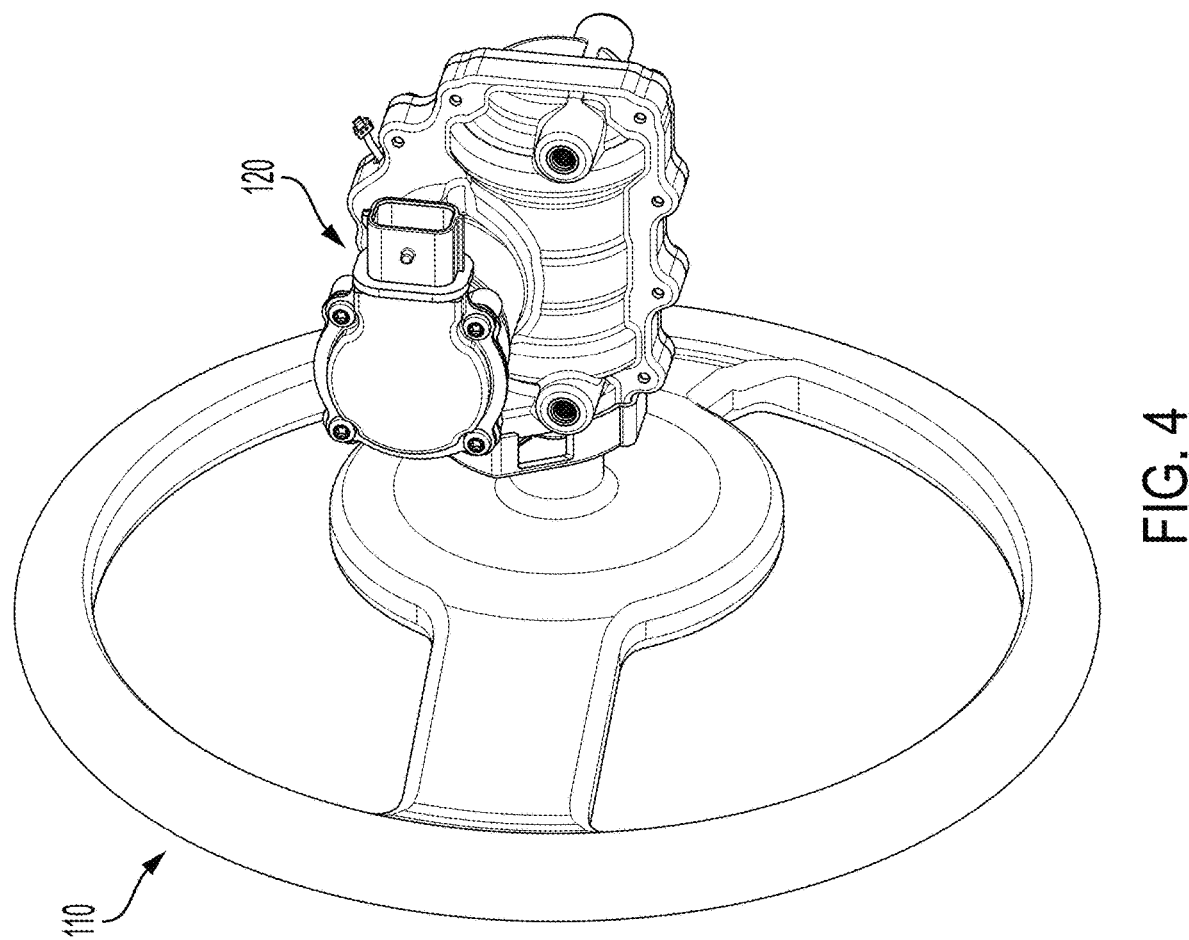
FIG. 4 shows another perspective view of the handwheel actuator and handwheel of FIG. 3.
Figure 5:
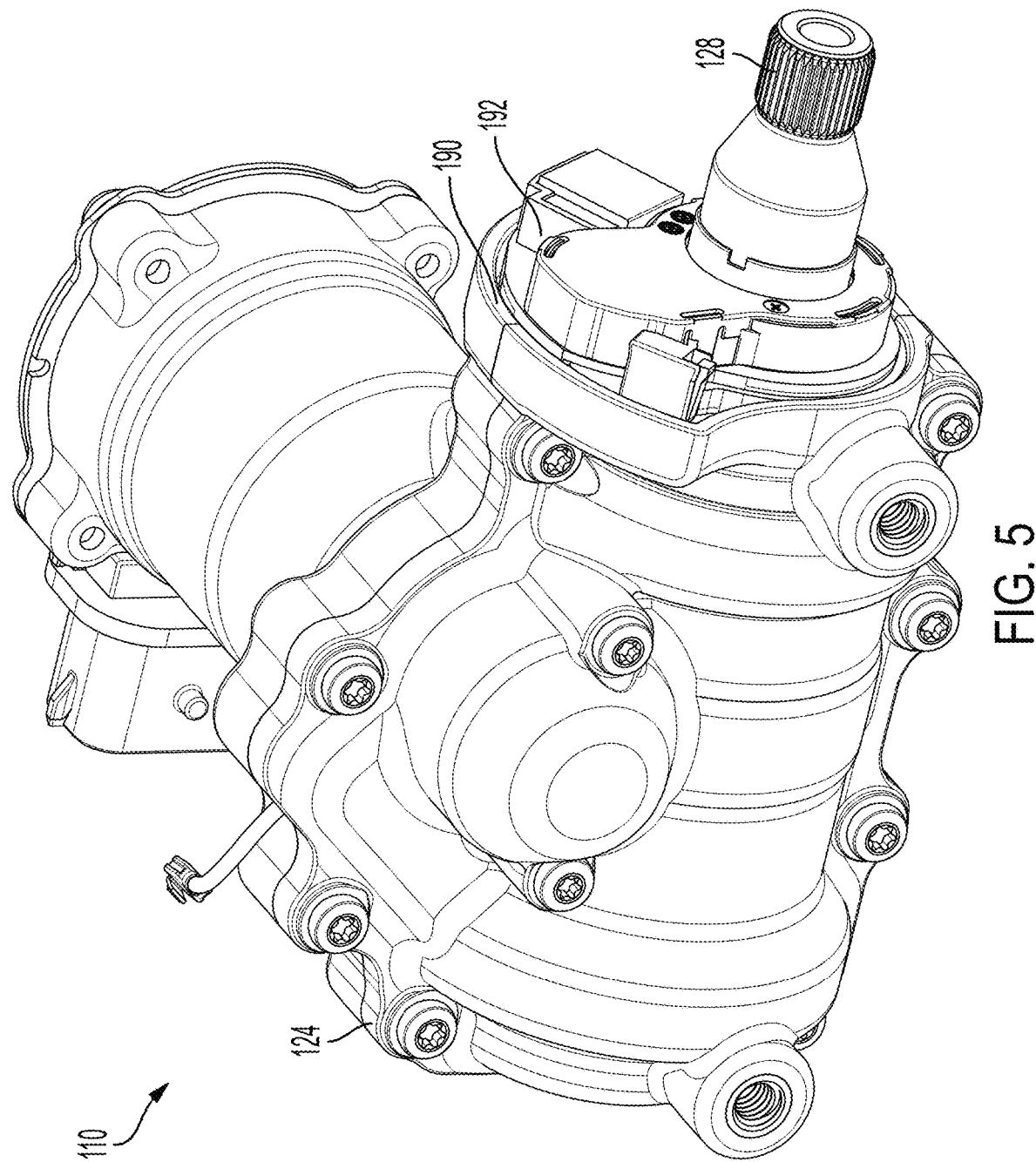
FIG. 5 shows a perspective view of the handwheel actuator of FIG. 3.

FIG. 2 shows an example embodiment of a torque versus angle plot for the HWA 10. The HWA 10 is capable of producing any characteristic line, curve, or curvilinear segment between the abscissa (x-axis) and upper line ("design max") within the plot. Stated otherwise, the HWA 10 is capable of producing any characteristic line, curve, or curvilinear segment that resides within the two shaded areas (I, II), such as those that are shown with broken lines. It should be noted that the maximum torque value depicted by the upper line could be increased or decreased with different spring designs. Thus the "design max" is not limited to 5 Nm. In a further example embodiment, the applied torque could be zero from 0 to 150 degrees of handwheel rotational angle and then increase to any value within the shaded areas.

The Zone I of FIG. 2 shows a condition where the motor is displacing the spring seat opposite the handwheel movement in order to increase the spring rate above the nominal spring line.

The Zone II of FIG. 2 shows a condition where the motor is displacing the spring seat in the same direction as the handwheel movement to decrease the spring rate below the nominal spring line.

If a constant torque is required during rotational displacement of the handwheel, the motor can displace the spring seat at the same speed and direction that the handwheel is moving. At this condition, there will be no relative movement between the handwheel and the spring seat.

The left boundary of the Zone I shown within FIG. 2 can be a function of motor speed such that a faster motor speed could push the left boundary further to the left. Additionally, a maximum handwheel speed design parameter could also influence the left boundary of the Zone I. A cross-section of the first and second springs 16A, 16B could be of any suitable shape including, but not limited to, round or ovate.

Two other operating conditions of the HWA 10 are also possible that are not captured within the plot of FIG. 2: i) high load operation (for example, greater than 5 Nm), and ii) failed state operation (no active control).

In an example embodiment, all steering load cases higher than 5 Nm ("high load operation") are treated the same. Typical load cases for this operation case include curb push off, etc. where the main goal of the HWA 10 is to provide feedback to the driver to stop turning. At handwheel loads higher than an upper threshold (for example 5 Nm), the spring seat will be in contact with the ±45 degree end stop on the handwheel shaft, effectively removing the spring from the system (spring rate drastically increases). Additionally, at this torque level, the geartrain between the motor and the spring seat becomes self-locking, as will be further described below. These two design features work together to create a mechanical end stop for the handwheel in this way. Since the external input needed to engage this mechanical end stop is handwheel torque in excess of 5 Nm, the HWA can position/engage this mechanical end stop at any handwheel angle.

In the case of a motor or controller failure where there is no active control ("failed state operation"), the system will not be able to provide feedback to the handwheel, as the worm geartrain is back drivable. This condition can be dangerous as excessively large inputs to the handwheel by the driver are possible when system torque is low. To counter this, a normally engaged passive friction element (damper) 30 is placed on the handwheel shaft to provide a constant base level of friction (e.g., 1.5 Nm) in event of a failure. This friction element is also used to dampen large oscillations caused by rapid returns to center during normal driving scenarios.

With the foregoing description of the operational characteristics of an HWA 10 in accordance with the present disclosure, FIGS. 3 through 17 show an exemplary embodiment of a handwheel actuator 110 for a handwheel 120 in accordance with the present disclosure. The handwheel actuator (HWA) 110 is configured with an actively controlled spring rate (Nm/deg) to allow the HWA 110 to create a variable force feedback for a driver, much like that of a traditional vehicle without a drive-by-wire steering system.

Figure 6:
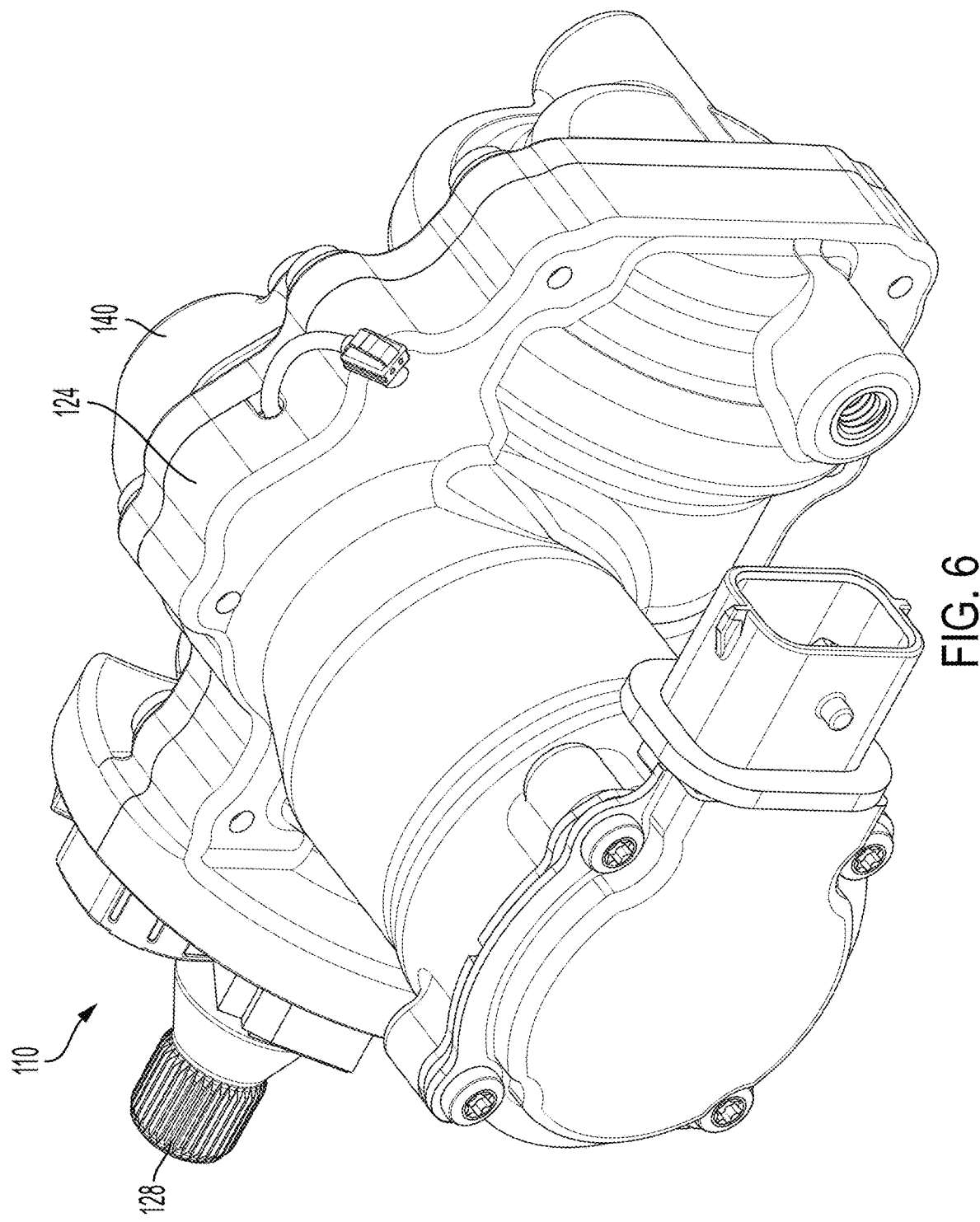
FIG. 6 shows a perspective view of the handwheel actuator of FIG. 3.
Figure 7:
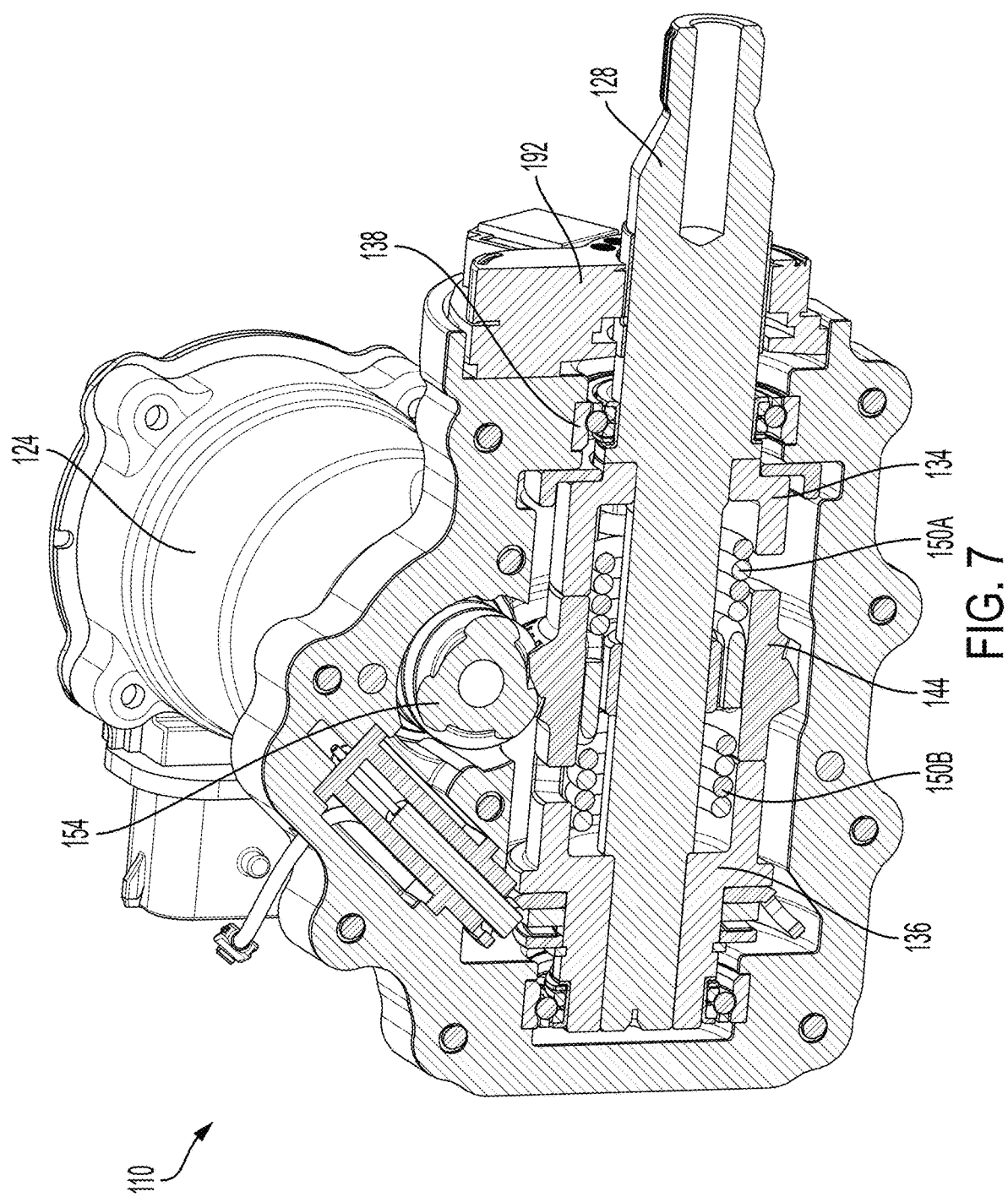
FIG. 7 shows a cross-sectional perspective view 3 taken through an axis of rotation of a steering shaft of the handwheel actuator of Figure.
Figure 8:
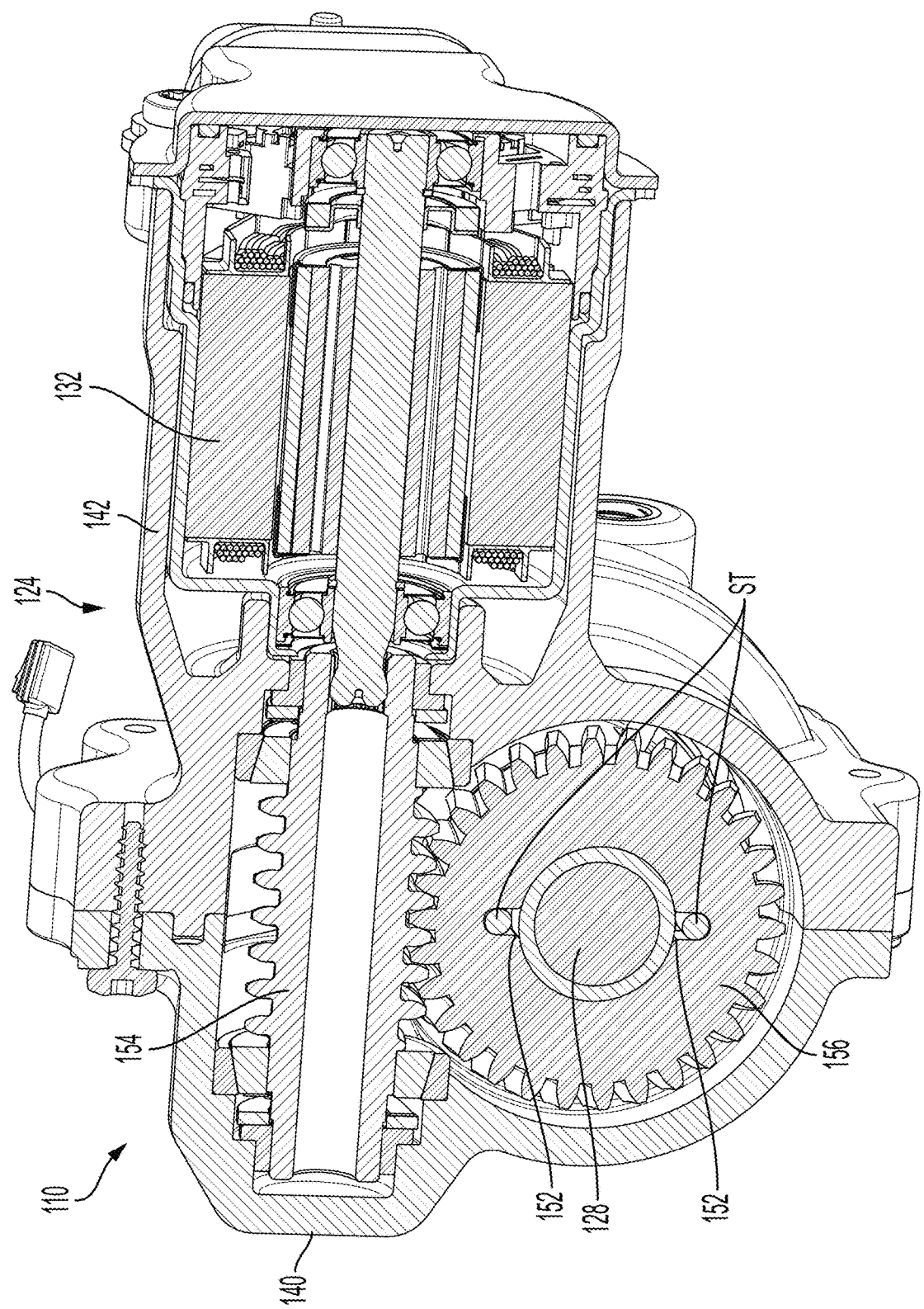
FIG. 8 shows a cross-sectional perspective view taken through an axis of rotation of a worm of the handwheel actuator of FIG. 3.
Figure 9:
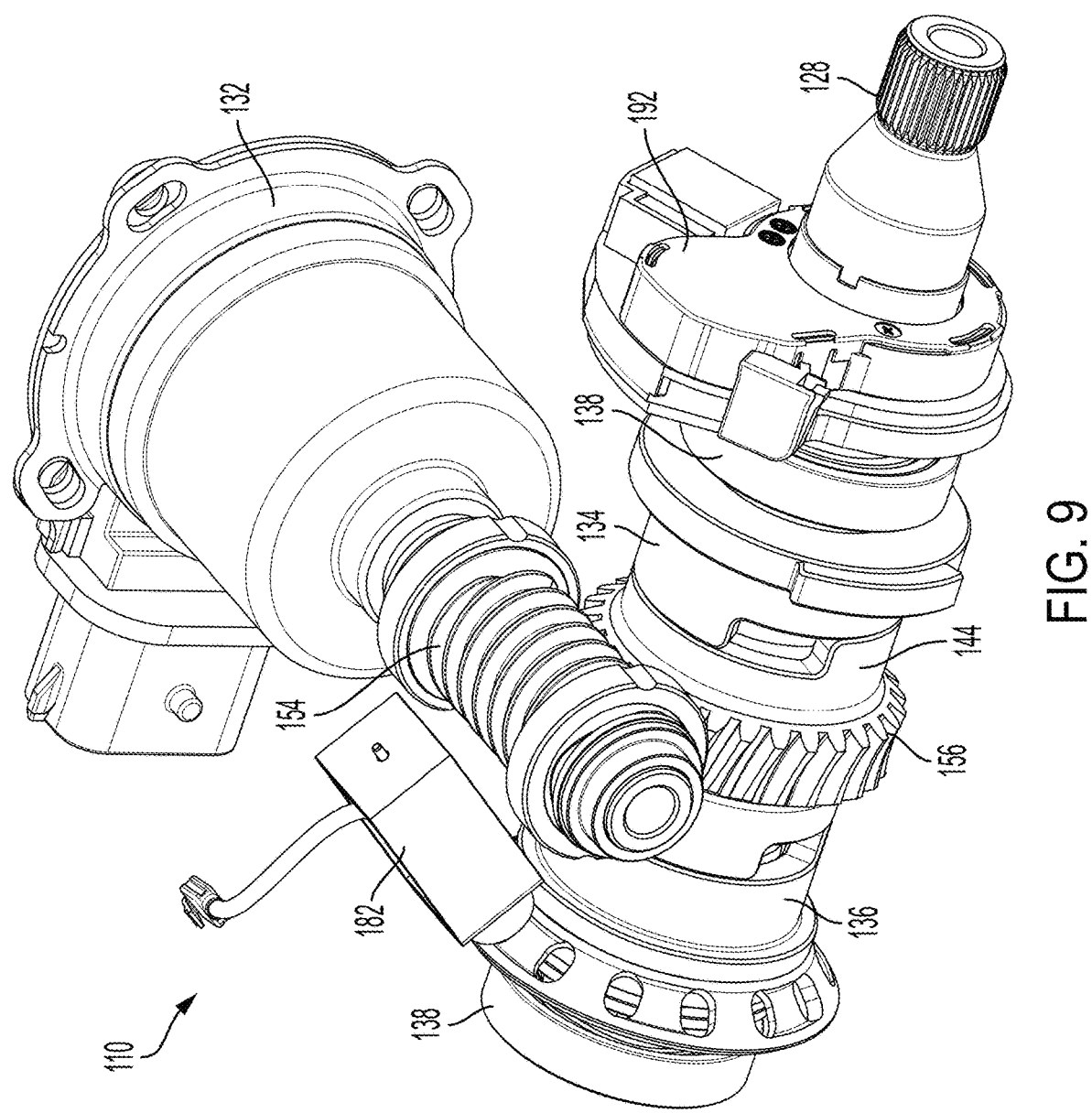
FIG. 9 shows a perspective view of a portion of the internal components of the handwheel actuator of FIG. 3.
Figure 10:
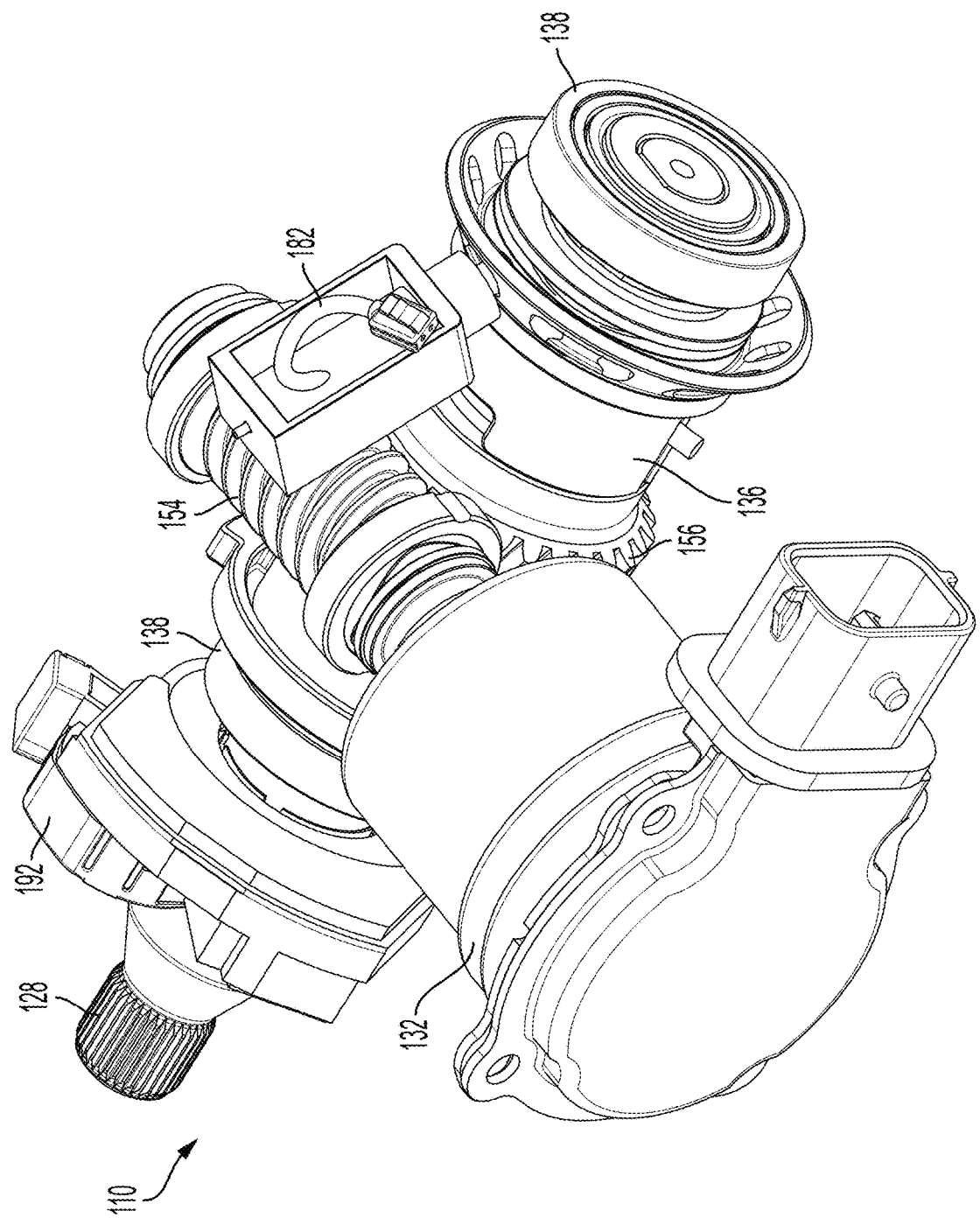
FIG. 10 shows another perspective view of a portion of the internal components of the handwheel actuator of FIG. 3.

The HWA 110 general includes a housing 124 supporting a steering shaft 128 and an electric motor 132. A first handwheel spring seat 134 and a second handwheel spring seat 136 are fixed to the steering shaft 128, both rotationally and axially. Bearings 138 are arranged on the steering shaft 128 to support the steering shaft 128 for rotation. The bearings 138 are housed and supported within a space captured by a cover 140 and drive housing 142, as shown in FIGS. 6 and 7.

Figure 11:
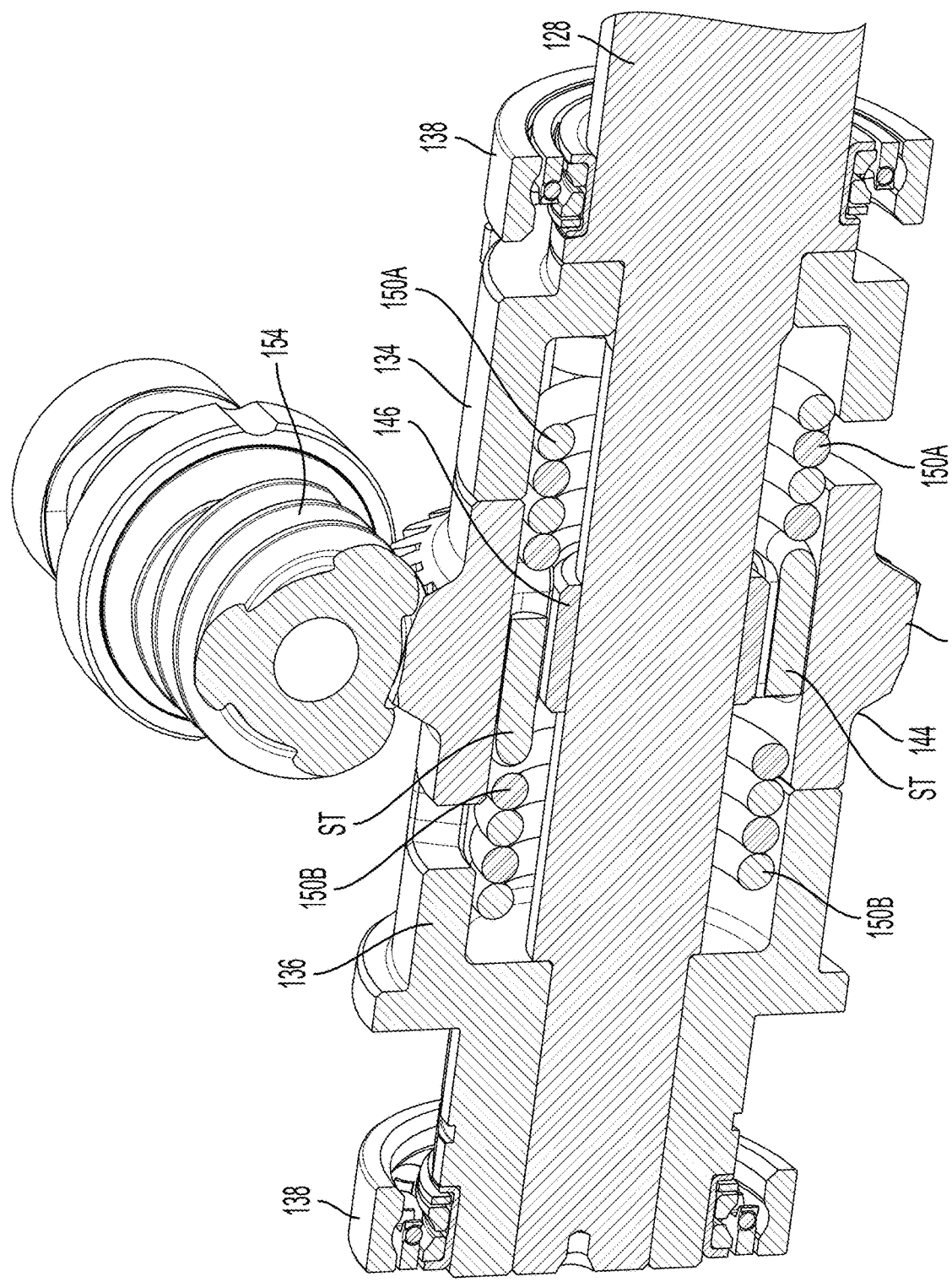
FIG. 11 shows a cross-sectional perspective view of a portion of the internal components taken through the axis of rotation of the steering shaft of the handwheel actuator of FIG. 3.
Figure 12:
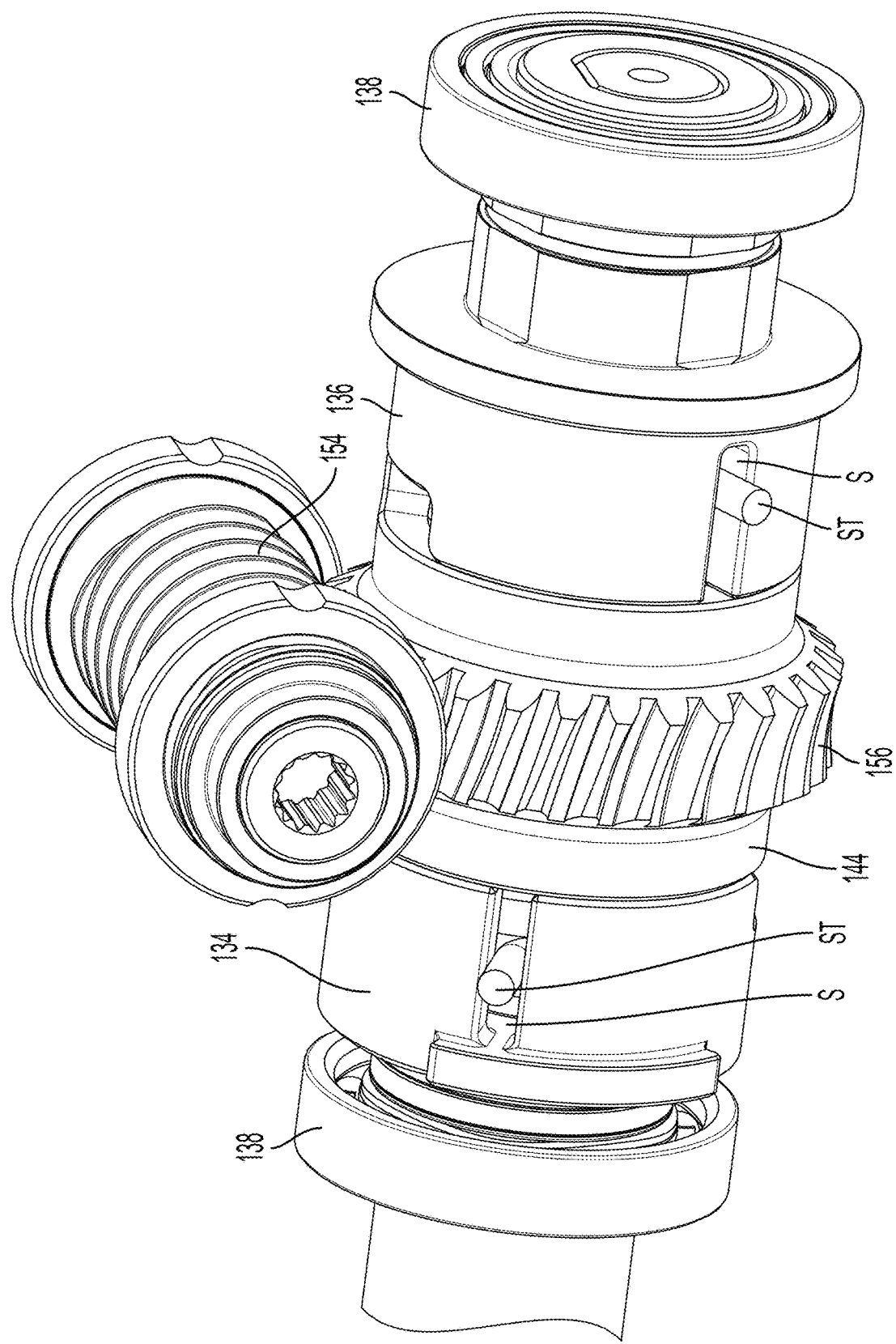
FIG. 12 shows a perspective view of a portion of the internal components of the handwheel actuator of FIG. 3.

Referring to FIGS. 11 and 12, a controlled spring seat 144, held axially by the handwheel spring seats 134 and 136, is radially supported on steering shaft 128 by a spring seat bushing 146 and is free to rotate up to ±45 degrees in this embodiment (other amounts are possible) relative to the steering shaft 128. First and second springs 150A, 150B, which, in an example embodiment are torsion springs, are supported by the handwheel spring seats 134 and 136 and the controlled spring seat 144. One spring tail ST of each spring 150A, 150B is engaged with a slot S of a respective handwheel spring seat 134 and 136. (see FIG. 12, for example), and the other spring tail ST is supported by an aperture 152 or slot arranged within the controlled spring seat 144 (see FIG. 14, for example). A worm 154 meshes with a worm gear 156 integrated into the controlled spring seat 144. The electric motor 132 drives the worm 154 to rotate the worm gear 156 to thereby rotate the controlled spring seat 144 (see FIGS. 8, and 14, for example).

In operation, the electric motor 132 can be used to increase or decrease a preload on first and second springs 150A, 150B in the manner described above. It will be appreciated that first and second springs 150A, 150B a wound in opposite directions such that rotation of the steering shaft 128 in a first direction winds one spring while unwinding the other spring, and vice versa when the steering shaft 128 is rotated in an opposite direction. Likewise, rotation of the controlled spring seat 144 in a first direction winds one spring while unwinding the other spring, and vice versa when the controlled spring seat 144 is rotated in an opposite direction.

Figure 13:
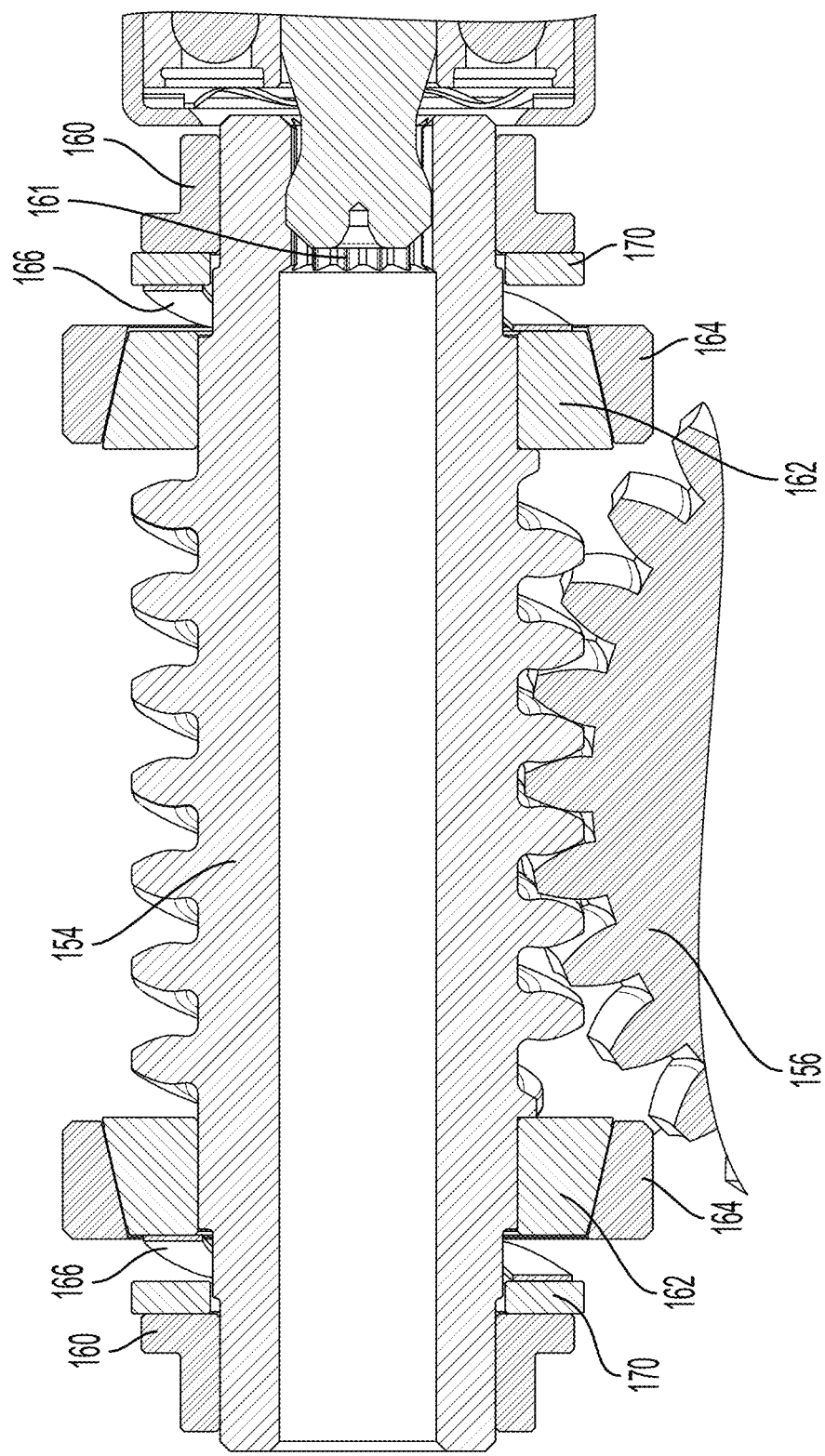
FIG. 13 shows a cross-sectional view of a portion of the internal components taken through the axis of rotation of the worm of the handwheel actuator of FIG. 3.
Figure 14:
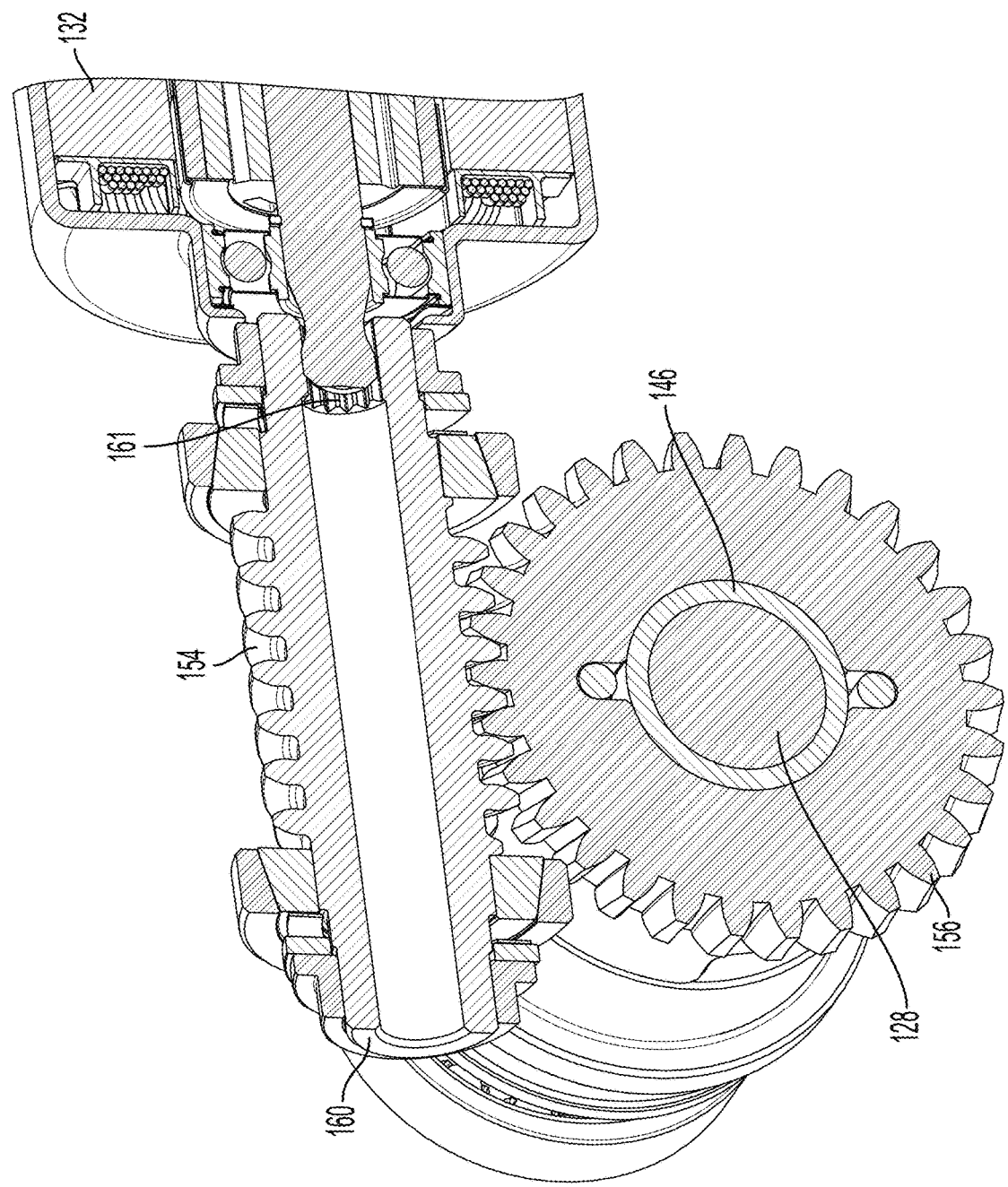
FIG. 14 shows a cross-sectional perspective view of a portion of the internal components of the handwheel actuator of FIG. 3.

Referring to FIGS. 13 and 14, worm 154 is supported by worm bushings 160 in a radial direction. Torque transmission from the electric motor 158 to the worm 154 is completed via a spline connection 161 such that the worm 154 can shift axially under certain conditions. At handwheel loads larger than 5 Nm, the worm 154 is displaced axially to engage a cone clutch ring 162 into a cone clutch seat 164, which increases system friction and creates a self-locking behavior. This activation load is set using cone clutch wave springs 166. The worm bushings 8 support a cone clutch washer 13 axially to facilitate this. It will be appreciated that the worm 160 can be displaced in either axial direction depending on the direction of rotation of the handwheel 120.

Figure 15:
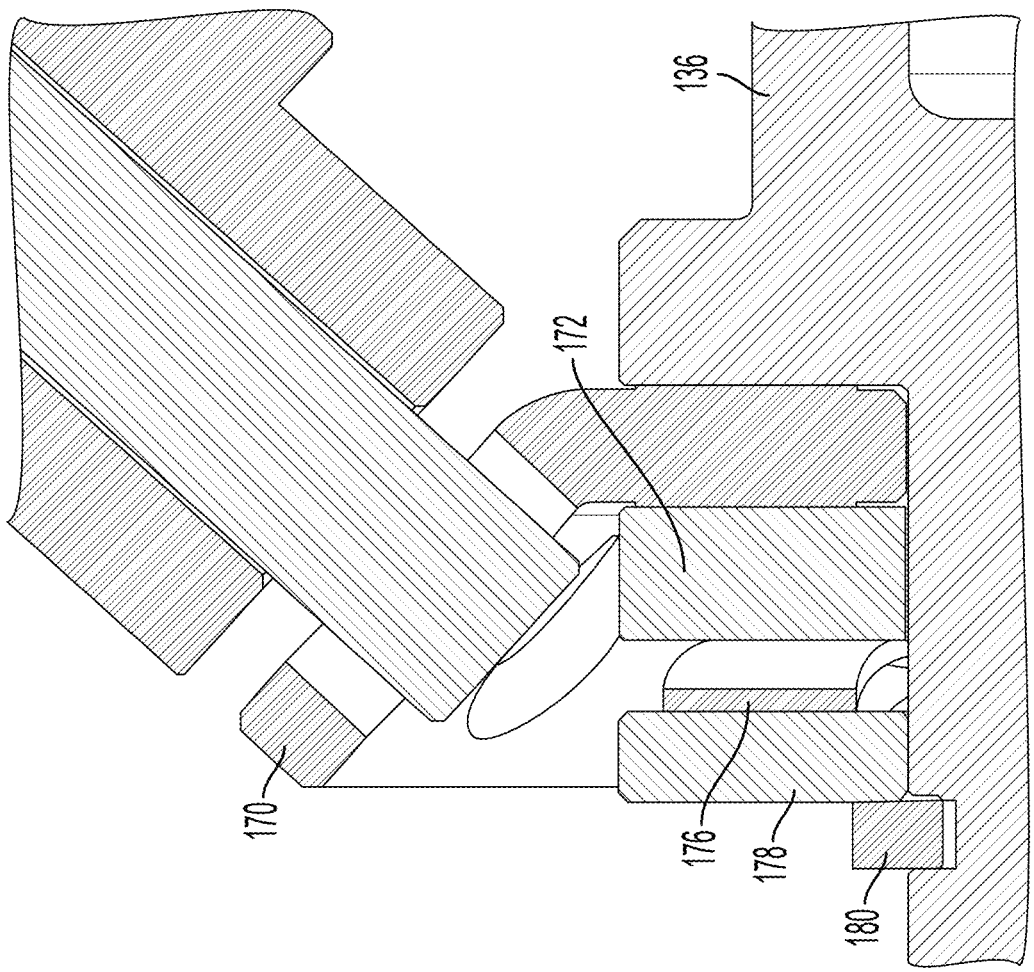
FIG. 15 shows a cross-sectional view of a portion of the internal components of the handwheel actuator of FIG. 3.
Figure 16:
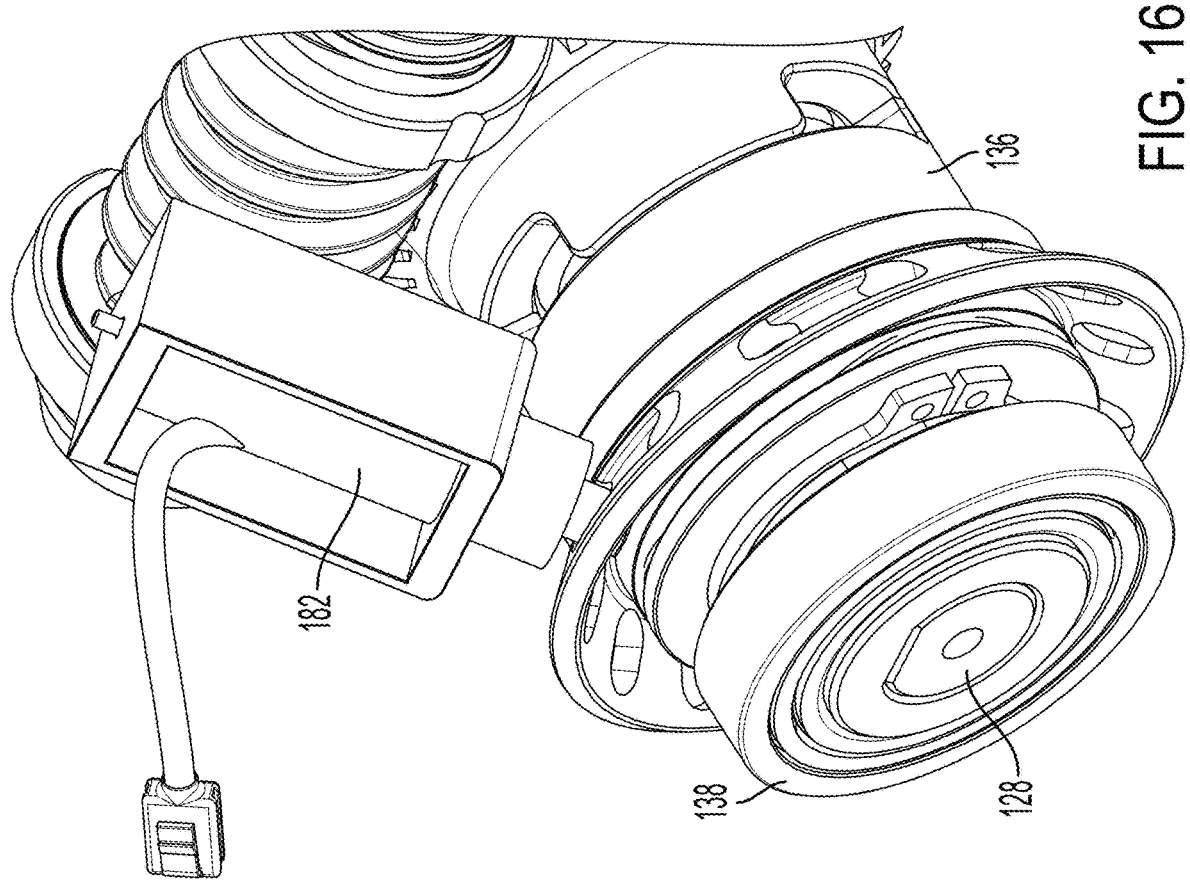
FIG. 16 shows a perspective view of a portion of the internal components of the handwheel actuator of FIG. 3.

Referring to FIGS. 15 and 16, the damper 30 shown schematically within FIG. 1 will now be described. The second handwheel spring seat 136 provides a first friction surface that a friction disk 170 is preloaded against. A second friction surface is provided by a friction washer 172, which is keyed to the second handwheel spring seat 136 to prevent relative rotation. Preload for the friction washer 172 is provided by a friction element wave spring 176 which is supported by a friction element washer 178. The friction element washer 178 is fixed axially by a snap ring 180. The system is switchable because of a friction element solenoid 182, which can engage or disengage the friction disk 170. The solenoid 182 is normally engaged, for reasons discussed earlier, but will be disengaged in most operating conditions.

Figure 17:
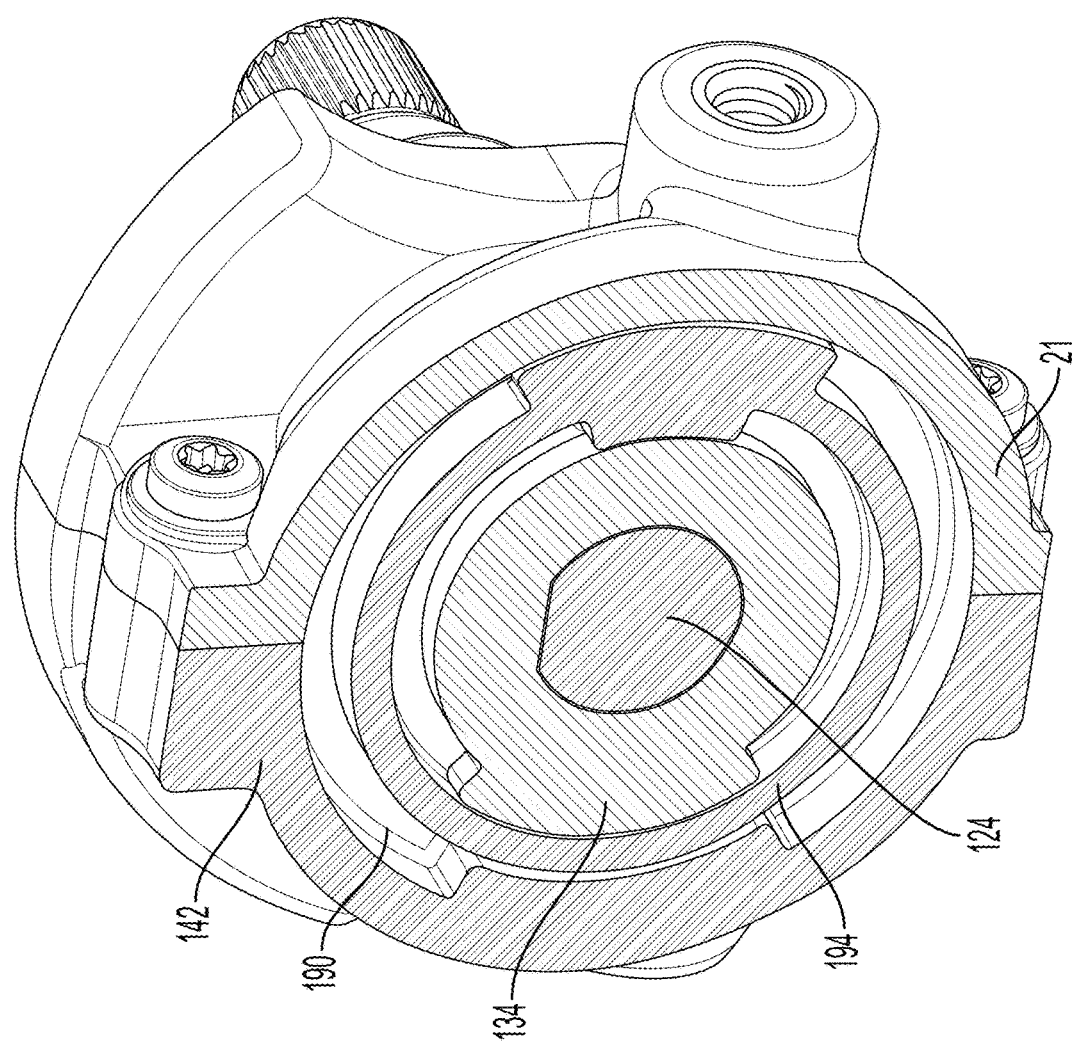
FIG. 17 shows a cross-sectional perspective view of an example embodiment of a mechanical end stop for the handwheel actuator of FIG. 3.

Referring to FIG. 17, a mechanical end stop 190 is shown. The mechanical end stop 190 at extreme ends of handwheel 120 (or steering wheel) travel is needed as a backup in cases where the motor 158 and/or control system have failed and cannot engage the variable end stops described earlier. Angle limitations on a torque angle sensor 192 (FIG. 5) and driver safety are the main reasons for the backup mechanical end stop 190. The mechanical end stop 190 engages approximately 5 degrees after the max targeted articulation angle, in order that it will not be utilized under actively controlled driving scenarios. Since total handwheel articulation ranges are generally larger than one full turn, a two-stage system is implemented to allow for handwheel articulation ranges of ±180 degrees and above. The first handwheel spring seat 134, which is rotationally fixed to the steering shaft 128, will rotationally engage an end stop ring 194 at approximately one-half of the total handwheel articulation angle range. The end stop ring 194 will rotationally engage the drive housing 142 at approximately one-half of the total handwheel articulation angle range. These two interfaces working in series creates the two-stage end stop system. The end stop ring 194 is radially supported by the first handwheel spring seat 134 but is free to rotate until engaged with either the first handwheel spring seat 134 or the drive housing 142.

In further example embodiments, the articulation range of the first and second springs 150A and 150B is not limited to ±45 degrees and can be varied according to the design needs of the HWA 100. Articulation ranges of 180 degrees, 270 degrees or greater are also possible.

In further example embodiments, alternative reduction arrangements between the electric motor 158 and the controlled spring seat 144 are possible. Electric motor gear reduction could be achieved with other suitable geartrains.

In further example embodiments, linear or compression springs, or a torsion bar could be utilized instead of torsion springs. Linear actuation of corresponding spring seats could be applied and achieve similar results.

In further example embodiments, standard plate-type clutch packs could be used to achieve the required friction to self-lock the system.

In further example embodiments, a variable pitch/helix angle worm and force generators such as wave springs could be used to achieve load dependent self-locking behavior.

In further example embodiments, active locking of the worm shaft could be used to prevent back driving. A solenoid-activated component could provide such a functionality.

In further example embodiments, the electric motor could prevent back driving by remaining energized during certain end stop conditions, meaning that self-locking behavior is not necessary for the end stop functionality.

In further example embodiments, other switchable passive friction elements could be used such as cone clutches, magnets, or band clutches.

In further example embodiments, other active friction elements could be used such as active disk clutches, cone clutches, band clutches, fluid dampers, magnetic particle brakes, and motors.

In further example embodiments, non-switchable friction elements could be used provided that the motor/spring system can overpower them. These could include a variety of clutches, magnets, or preloaded/skewed support bearings.

In further example embodiments, a steering column can be interposed between the steering shaft and the handwheel and may provide additional functionality such as tilting and/or telescoping of the handwheel.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

10 HWA
12 Steering Shaft
14 Motor
16A Spring
16B Spring
30 Friction Element
110 HWA
120 Handwheel
124 Housing
128 Steering Shaft
132 Electric Motor
134 First Handwheel Spring Seat
136 Second Handwheel Spring Seat
138 Bearings
140 Cover
142 Drive Housing
144 Controlled Spring Seat
146 Spring Seat Bushing
150A First Spring
150B Second Spring
152 Aperture
154 Worm
156 Worm Gear
160 Bushings
161 Spline Connection
162 Cone Clutch Ring
164 Cone Clutch Seat
166 Wave Spring 170 Friction Disk
172 Friction Washer
176 Wave Spring
178 Friction Element Washer
180 Snap Ring
182 Solenoid
190 End Stop
192 Torque Angle Sensor
194 End Stop Ring
SS Spring Seat
ST Spring Tail
S Slot

What is claimed is:

1. A handwheel actuator for a steering system, the handwheel actuator comprising:
a housing;
a steering shaft supported by the housing and configured to be coupled to a handwheel for receiving driver input from a driver and transmitting feedback to the driver;
a first spring for biasing the steering shaft in a first rotational direction, the first spring coupled to the steering shaft by a first static spring seat; a second spring for biasing the steering shaft in a second rotational direction opposite the first rotation direction;
the second spring coupled to the steering shaft by a second static spring seat;
a controlled spring seat coupled to the first spring and the second spring and rotatable to change a pre-load of at least one of the first or second springs;
wherein rotation of the controlled spring seat changes a torsional load applied to the steering shaft via at least one of the first spring or the second spring;
wherein the controlled spring seat is arranged coaxially with the first static spring seat and the second static spring seat about the steering shaft.

2. The handwheel actuator of claim 1, further comprising a damper for resisting rotation of the steering shaft.

3. The handwheel actuator of claim 2, wherein the damper is selectively activatable between an engaged state resisting rotation of the steering shaft and a disengaged state.

4. The handwheel actuator of claim 3, further comprising an actuator for engaging and disengaging the damper.

5. The handwheel actuator of claim 4, wherein the actuator includes a normally-engaged solenoid.

6. The handwheel actuator of claim 1, further comprising a mechanical end stop for limiting rotation of the steering shaft.

7. The handwheel actuator of claim 6, wherein the mechanical end stop restricts rotation of the steering shaft in excess or minus 5 degrees beyond a maximum total handwheel articulation.

8. The handwheel actuator of claim 1, wherein an articulation range of the first and second springs is plus or minus 45 degrees.

9. The handwheel actuator of claim 1, further comprising an electric motor configured to rotate the controlled spring seat.

10. The handwheel actuator of claim 9, wherein the electric motor is coupled to a worm that drives a worm gear to rotate the controlled spring seat.

11. The handwheel actuator of claim 10, wherein the worm gear is integral with the controlled spring seat.

12. The handwheel actuator of claim 11, wherein the controlled spring seat includes axial slots for receiving spring tails of the first and second springs.

13. The handwheel actuator of claim 10, wherein the worm is connected to the electric motor by a splined connection and supported by the housing for limited axial movement.

14. The handwheel actuator of claim 13, further comprising at least one clutch for resisting rotation of the worm when the worm is displaced axially.

15. The handwheel actuator of claim 14, wherein the at least one clutch includes a cone clutch and activation of the cone clutch is determined by a wave spring that resists axial displacement of the worm.

16. A handwheel actuator for a steering system, the handwheel actuator comprising:
a housing;
a steering shaft supported by the housing and configured to be coupled to a handwheel for receiving driver input from a driver and transmitting feedback to the driver;
a first spring for biasing the steering shaft in a first rotational direction, the first spring coupled to the steering shaft by a first static spring seat; a second spring for biasing the steering shaft in a second rotational direction opposite the first rotation direction;
the second spring coupled to the steering shaft by a second static spring seat;
a controlled spring seat coupled to the first spring and the second spring and rotatable to change a pre-load of at least one of the first or second springs;
wherein rotation of the controlled spring seat changes a torsional load applied to the steering shaft via at least one of the first spring or the second spring; and wherein the first and second springs include torsion springs supported coaxially with the steering shaft.

17. The handwheel actuator of claim 16, wherein the first and second springs are wound in opposite directions.

18. A handwheel actuator for a steering system, the handwheel actuator comprising:
a housing;
a steering shaft supported by the housing and configured to be coupled to a handwheel for receiving driver input from a driver and transmitting feedback to the driver;
a first spring for biasing the steering shaft in a first rotational direction, the first spring coupled to the steering shaft by a first static spring seat; a second spring for biasing the steering shaft in a second rotational direction opposite the first rotation direction;
the second spring coupled to the steering shaft by a second static spring seat;
a controlled spring seat coupled to the first spring and the second spring and rotatable to change a pre-load of at least one of the first or second springs;
wherein rotation of the controlled spring seat changes a torsional load applied to the steering shaft via at least one of the first spring or the second spring; and
wherein the torsional load is defined by a non-linear characteristic curve within a torsional load versus handwheel rotational angle plot.

* * * * *